(12) United States Patent
Fritzsche

(10) Patent No.: US 6,536,580 B1
(45) Date of Patent: Mar. 25, 2003

(54) DISTRIBUTION DEVICE FOR PIECE GOODS

(75) Inventor: Roland Fritzsche, Stein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,069

(22) PCT Filed: Sep. 17, 1999

(86) PCT No.: PCT/DE99/02990

§ 371 (c)(1),
(2), (4) Date: Feb. 28, 2001

(87) PCT Pub. No.: WO00/17078

PCT Pub. Date: Mar. 30, 2000

(30) Foreign Application Priority Data

Sep. 23, 1998 (DE) .......................... 198 43 623

(51) Int. Cl.$^7$ .............................................. B65G 47/02
(52) U.S. Cl. .............................. 198/370.07; 198/370.08
(58) Field of Search ................... 198/370.08, 370.07, 198/370.02, 370.01

(56) References Cited

U.S. PATENT DOCUMENTS

| | | | | |
|---|---|---|---|---|
| 3,198,308 A | * | 8/1965 | Driesch et al. | 198/370.08 |
| 3,921,786 A | * | 11/1975 | Hejmanowski | 198/370.08 |
| 3,955,678 A | * | 5/1976 | Moyer | 198/370.08 |
| 4,643,291 A | * | 2/1987 | Counter et al. | 198/367 |
| 4,850,471 A | * | 7/1989 | Annas, Sr. et al. | 198/372 |
| 5,655,643 A | * | 8/1997 | Bonnet | 198/370.08 |
| 5,887,699 A | * | 3/1999 | Tharpe | 198/370.02 |
| 5,918,724 A | * | 7/1999 | Terrell et al. | 198/370.07 |
| 6,068,105 A | * | 5/2000 | Darwish et al. | 198/370.02 |
| 6,220,421 B1 | * | 4/2001 | Jugon et al. | 198/370.07 |
| 6,220,422 B1 | * | 4/2001 | Lee | 198/370.07 |

FOREIGN PATENT DOCUMENTS

| | | | | |
|---|---|---|---|---|
| DE | 3422 150 A1 | 12/1985 | | B65G/47/64 |
| EP | 0 199 412 A1 | 4/1986 | | B07C/3/06 |
| EP | 0 794 137 A1 | 9/1997 | | B65G/47/76 |

* cited by examiner

Primary Examiner—Douglas Hess
(74) Attorney, Agent, or Firm—Philip G. Meyers

(57) ABSTRACT

The invention pertains to a distribution device for parcels with a deflection element for distributing the parcels that arrive on a conveyor pathway in approximately the horizontal direction to branched-off conveyor pathways with approximately the same transport plane. According to the invention, three conveyor pathways (T1, T2, T3) branch off from a distribution point. The ends of the deflection element (A) are connected to horizontally displaceable plungers of stationary stroking mechanisms (H1, H2) by means of pivot points (D1, D2) in order to displace the ends from one lateral limit of the central conveyor pathway (T3) to the other lateral limit. One of the two stroking mechanisms (H1, H2) is fixed perpendicularly to the transport direction of the central conveyor pathway (T3), with the other stroking mechanism (H1, H2) being mounted in a pivoted fashion.

11 Claims, 3 Drawing Sheets

Figure 4:
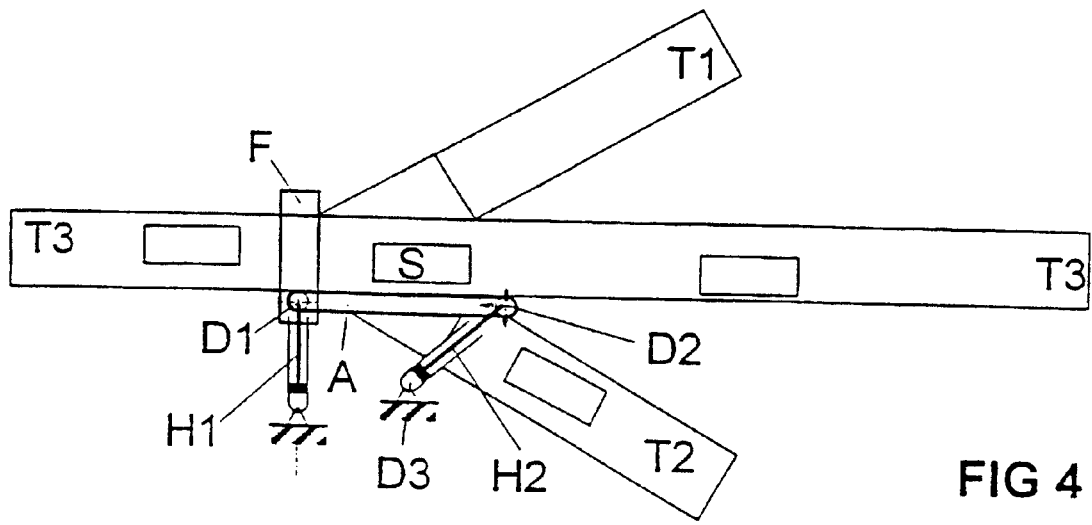

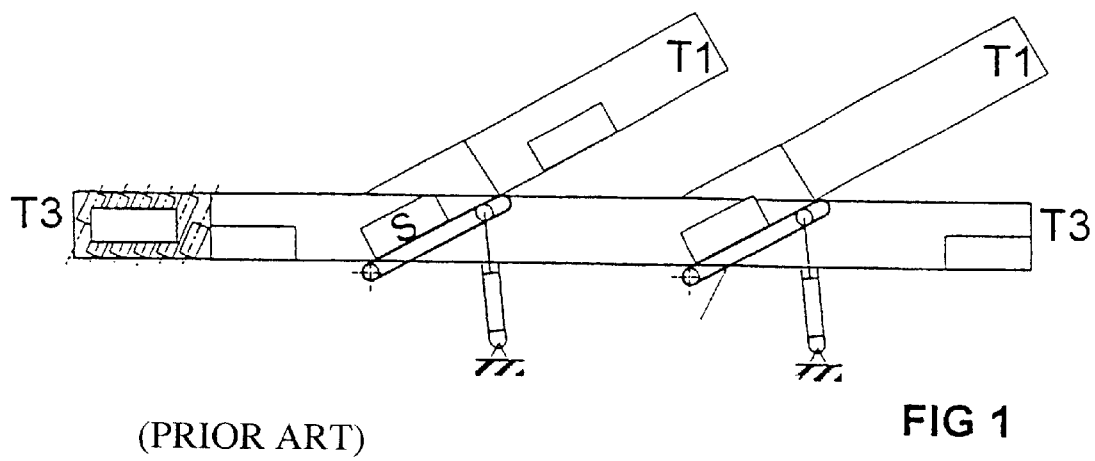
(PRIOR ART)   FIG 1
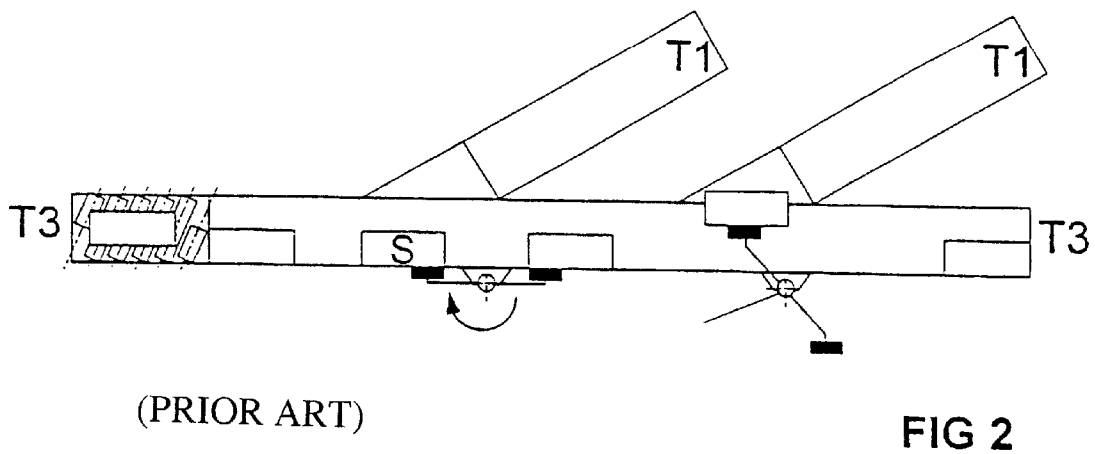
(PRIOR ART)   FIG 2
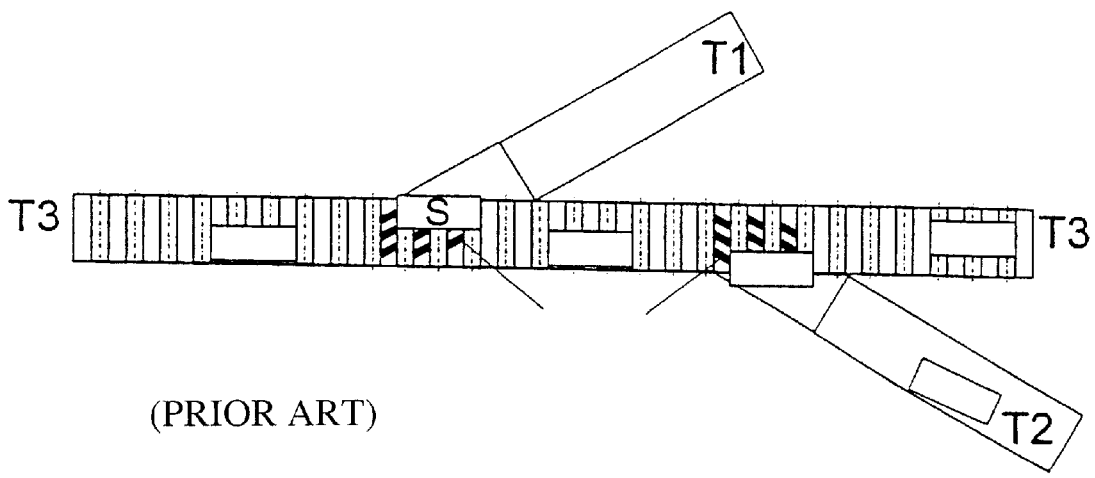
(PRIOR ART)   FIG 3

DISTRIBUTION DEVICE FOR PIECE GOODS

DESCRIPTION

The invention pertains to a device for distributing parcels wherein a deflection element for distributing parcels supplied on a driven conveyor pathway to one of three conveyor pathways that branch off from a distribution point, with the central conveyor pathway representing a linear extension of the supply direction, has ends connected to horizontally displaceable plungers of stationary stroking mechanisms by means of pivot points in order to displace the ends from one lateral limit of the central conveyor pathway to the other lateral limit. One of the two stroking mechanisms is fixed perpendicularly to the transport direction of the central conveyor pathway and the other stroking mechanism is pivotally mounted, with the deflection element being positioned in such a way and having such longitudinal dimensions that the deflection element either extends laterally along the outer edge of the central conveyor pathway or transversely across the entire central conveyor pathway in the form of an extension of the rear limit of one of the two outer branched-off conveyor pathways when viewed in the transport direction.

In order to automatically sort parcels, e.g., packages, small parcels, freight or containers, that are already separated and transported on conveyor pathways, they need to be distributed in at least two directions from one supply direction. The parcels reach several sorting stations/sorting containers after one distribution stage or several distribution stages that are arranged behind one another in this fashion.

Known devices for realizing a horizontal distribution contain only one branch and consequently distribute in only two directions. According to a first variation (FIG. 1), the parcels are deflected to the branched-off conveyor pathway by means of a deflection element that is laterally fixed to the main conveyor pathway in a pivoted fashion and pivoted into the main conveyor pathway (FAM belt conveyor by FAM Magdeburger Forderanlagen und Baumaschinen).

According to a second variation (FIG. 2), the distribution is realized with the aid of rotating ejectors (ROTA sorter by Lippert).

When using roller conveyors as conveyor pathways, narrow driven rollers that are directed to the branched-off conveyor pathway are, according to a third variation (FIG. 3), arranged at the branching point between the rollers of the main conveyor pathway. These narrow driven rollers are, whenever necessary, raised above the transport plane of the main conveyor pathway and consequently transport the parcel in question to the branched-off conveyor pathway (Pop-Up sorter by Van Der Lande Industries).

If it is required to distribute the parcels in three directions, two of these known distribution devices need to be arranged behind one another. However, this results in a high space requirement in the longitudinal direction as well as a relatively high expenditure.

Consequently, the invention disclosed herein is based on the objective of developing a device for distributing parcels in an approximately horizontal plane which makes it possible to distribute the supplied parcels to three conveyor pathways, with low cost and space requirements.

The basic idea of the invention consists of displacing a deflection element, which is pivotally arranged at its ends, across the entire width of the pathway in a targeted fashion such that, depending on the respective requirements, it is situated along one of the edges of the supplying conveyor pathway and thus allows transport in the central direction, or such that it is transversely situated with one end angling into the supply conveyor pathway and deflects the parcels into one of the two branched-off conveyor pathways.

In one embodiment according to the invention, the deflection element has a smooth deflecting surface with a low coefficient of friction such that only low deceleration forces act upon the parcels.

In another embodiment, the surface of the deflection element that deflects the parcels consists of a driven endless conveyor belt. Due to this measure, the parcels are actively deflected by the deflection element into the direction of the respective branched-off conveyor pathway. This results in a largely slip-free, positionally-defined deflection movement of the parcels.

In order to keep the distance between the parcels as small as possible and thus achieve a high throughput rate, the deflection mechanisms and the control are, according yet another embodiment, designed in such a way that a movement of the deflection element may also take place if a parcel is situated on the deflection element.

Further, pneumatic or hydraulic stroking cylinders, lifting magnets as well as electromechanical drive assemblies, e.g., linear drives or electric motors with motion converters, are advantageously provided as stroking mechanisms.

One embodiment of the invention is described in greater detail below. The figures show:

FIGS. 1–3, top views of solutions according to the prior art, and

FIGS. 4–7, schematic top views of the distribution device with different positions of the deflection element A.

The parcels S to be sorted are transported on the conveyor pathways T. These conveyor pathways may, for example, be realized in the form of driven underfloor belts or roller conveyors. Viewed in the transport direction, the rear end of deflection element A is guided perpendicularly to the supplying conveyor pathway T3 across its entire width on a stable guide frame F by means of a pivot point D1. The pivot point D1 is connected to the plunger of a stroking mechanism H1 that serves as a drive for causing movement of the rear end of the deflection element A. Directly behind the guide frame F, the horizontal supply conveyor pathway T3 branches off into two horizontally aligned conveyor pathways T2 and T1 that extend, respectively, toward the right and the left at an angle of approximately 30° and into a third conveyor pathway T3 that represents a linear extension of the supply conveyor pathway T3. The front end of the deflection element A, viewed in the transport direction, is also connected to a stroking mechanism H2 by means of a pivot point D2. This stroking mechanism H2 is not, however, realized rigidly, but is fixed such that it can be pivoted at a pivot point D3.

Figure 5:
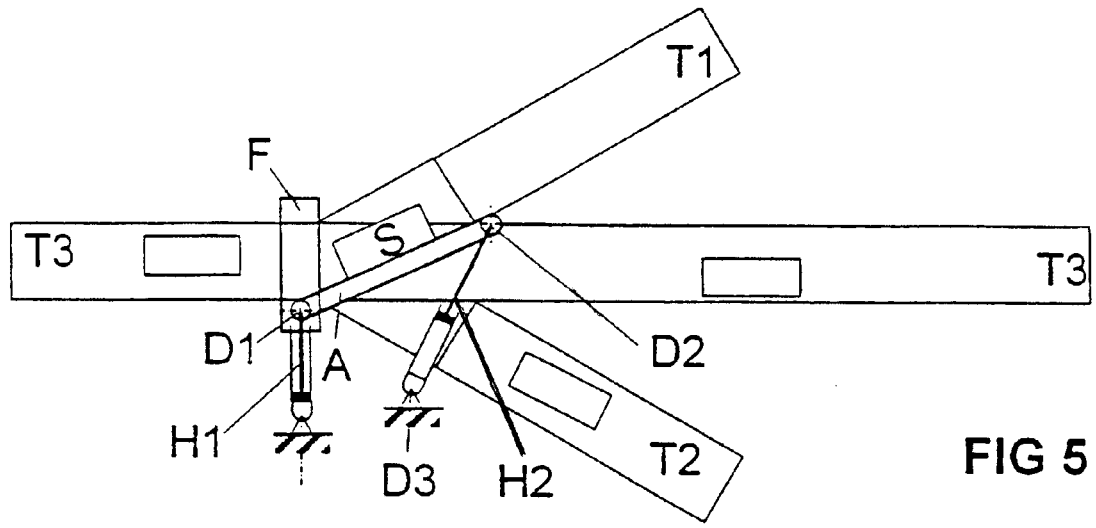

In FIG. 4, the plungers of both stroking mechanisms H1, H2 are retracted, and the deflection element A is situated at the edge of the conveyor pathway T3 on the side of the branched-off conveyor pathway T2, and consequently releases the conveyor pathway T3, i.e., the parcels are further transported in a linear fashion. If an arriving parcel S should be further transported via conveyor pathway T1, the stroking mechanism H2 extends the plunger at the front end of the deflection element A across the entire width of the conveyor pathway T3, with this movement of the deflection element A being possible due to its length. FIG. 5 indicates that the parcel is deflected in the direction of the conveyor pathway T1 at the deflection element A. If the next parcel S should again be further transported on the conveyor pathway T3, the deflection element A needs to be displaced again to a parallel position along the edge of the conveyor pathway T3.

Figure 6:
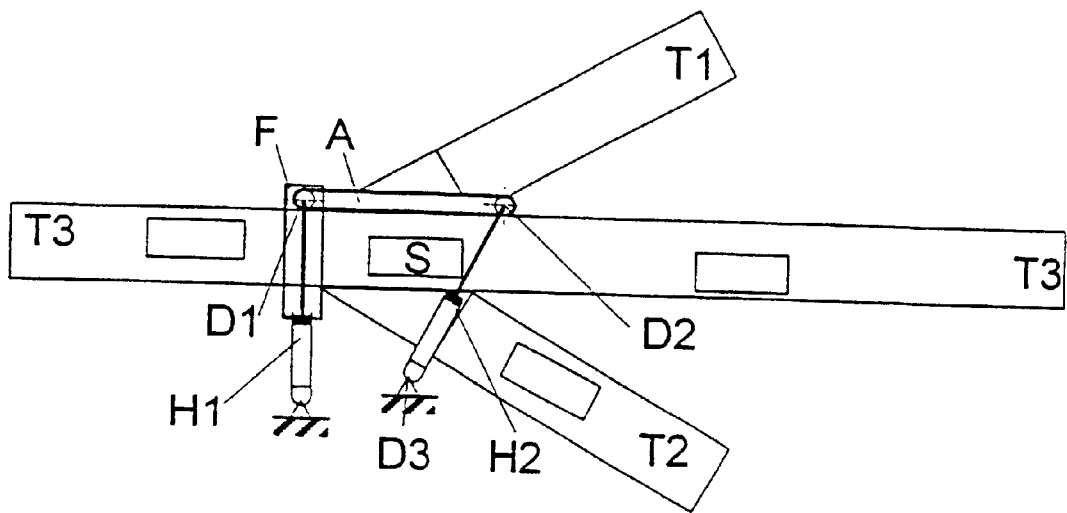
Figure 7:
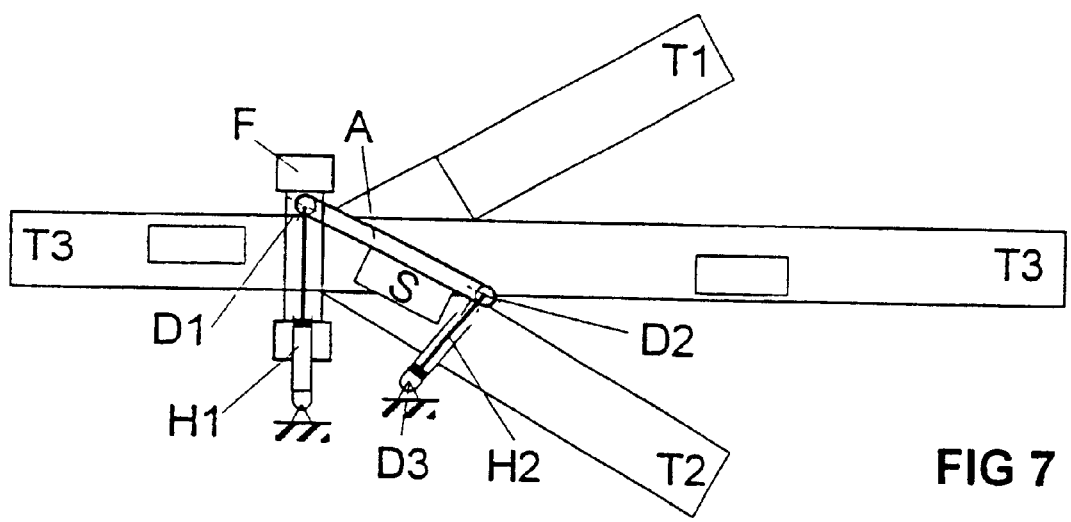

In FIG. 6, the plunger of the stroking mechanism H1 extends across the width of the conveyor pathway, and the plunger of the other stroking mechanism H2 maintains its position. Consequently, the deflection element A is placed along side the branched-off conveyor pathway T1.

Since the next parcel S should be deflected to the conveyor pathway T2, the plunger of the stroking mechanism H2 is, according to FIG. 7, retracted again such that the deflection element A lies across the conveyor pathway T3 in the direction of the conveyor pathway T2, into which the parcel S in question is deflected.

Distribution of the parcels S is based on distribution information that can be obtained from the parcels S by means of sensors and evaluation devices, not shown. The respective positions of the parcels S on the conveyor pathways T, particularly in front of the distribution points, is also determined by means of sensors. Based on this information, the plungers of the stroking mechanisms H1, H2 are controlled with the aid of a control device, not shown, such that the respective parcel S is distributed according to its distribution information and position. During a distribution along the conveyor pathway T3, the deflection element A may be situated on either side of the conveyor pathway T3.

If the deflection element a must be moved in the presence of parcels S in the distribution region while maintaining the smallest possible distances between the parcels so as to achieve a high throughput rate, the deflection element a needs to be previously situated on the side of the conveyor pathway T3 from which the deflection element a deflects the respective parcel S into the branched-off conveyor pathway T1 or T2 via a plunger movement of the stroking element H2.

What is claimed is:

1. Distribution device for parcels, with a deflection element for distributing the parcels that are supplied on a driven conveyor pathway in approximately the horizontal direction to branched-off conveyor pathways with approximately the same transport plane as the supply conveyor pathway, characterized by the fact that three conveyor pathways branch off from a distribution point, with the central conveyor pathway representing a linear extension of the supply direction, with the ends of the deflection element being connected to horizontally displaceable plungers of stationary stroking mechanisms by means of pivot points in order to displace the ends from one lateral limit of the central conveyor pathway to the other lateral limit, with one of the two stroking mechanisms being fixed perpendicularly to the transport direction of the central conveyor pathway and the other stroking mechanism being pivotally mounted, and with the deflection element being positioned in such a way and having such longitudinal dimensions that the deflection element either extends laterally along the outer edge of the central conveyor pathway or transversely across the entire central conveyor pathway in the form of an extension of the rear limit of one of the two outer branched-off conveyor pathways when viewed in the transport direction.

2. Distribution device according to claim 1, characterized by the fact that the deflection element has a smooth deflecting surface with a low coefficient of friction.

3. Distribution device according to claim 1, characterized by the fact that the part of the deflection element which deflects the parcels consists of a driven endless conveyor belt.

4. Distribution device according to claim 1, characterized by the fact that the deflection element can be moved within the distribution region in the presence of parcels.

5. Distribution device according to claim 1, characterized by the fact that the stroking mechanisms consist of pneumatic or hydraulic stroking cylinders.

6. Distribution device according to claim 1, characterized by the fact that the stroking mechanisms consist of stroking magnets.

7. Distribution device according to claim 1, characterized by the fact that the stroking mechanisms consist of electromechanical drive assemblies with electric motors.

8. A parcel sorting system, comprising:

a substantially horizontal incoming conveyor pathway;

a first branching conveyor pathway positioned to receive parcels diverted from the incoming conveyor pathway to one side;

a second branching conveyor pathway positioned to receive parcels diverted from the incoming conveyor pathway to the other side at a position opposite the first branching conveyor pathway;

a deflection system including a deflection element positionable for movement into the incoming conveyor pathway in a first position to deflect parcels that are supplied on the incoming conveyor pathway to the first branching pathway, in a second position to deflect parcels that are supplied on the incoming conveyor pathway to the second branching pathway, and in a third position out of incoming conveyor pathway to permit continued movement of a parcel on the incoming conveyor pathway past the first and second branch pathways, the deflection system comprising a first stroking mechanism having an extendable portion connected to a first end of the deflection element; and a second stroking mechanism having an extendable portion connected to a second end of the deflection element opposite the first end, wherein the first and second stroking mechanism are operable to move the deflection system between the first, second and third positions.

9. The system of claim 8, wherein the extendable portions of the first and second stroking mechanisms are connected by pivots to the ends of the deflection element.

10. The system of claim 9, wherein the first stroking mechanism is positioned so that the extendable portion extends in a direction perpendicular to the direction of travel of the incoming conveyor pathway, and the second conveyor pathway extends at an angle to the direction of travel of the incoming conveyor pathway, whereby in the first position the deflection element extends in parallel with the to the direction of travel of the first branching conveyor pathway, in the second position the deflection element extends in parallel with the to the direction of travel of the second branching conveyor pathway, and in the third position the deflection element extends in parallel with the to the direction of travel of the incoming conveyor pathway.

11. The system of claim 10, wherein the first and second stroking mechanisms are operable to move the deflection element to a fourth position in which the deflection element extends in parallel to the direction of travel of the incoming conveyor pathway on the side of the incoming conveyor pathway opposite the third position.

* * * * *